United States Patent
Hobrath et al.

(10) Patent No.: US 10,512,213 B2
(45) Date of Patent: Dec. 24, 2019

(54) DOUBLE DECK BOOTS

(71) Applicant: MTD Products Inc, Valley City, OH (US)

(72) Inventors: Gerald Hobrath, Brunswick, OH (US); Anthony Harrison, Spencer, OH (US); Robert L. Jira, Jr., Middleburg Heights, OH (US)

(73) Assignee: MTD Products Inc, Valley City, OH (US)

( * ) Notice: Subject to any disclaimer, the term of this patent is extended or adjusted under 35 U.S.C. 154(b) by 95 days.

(21) Appl. No.: 15/711,298

(22) Filed: Sep. 21, 2017

(65) Prior Publication Data

US 2018/0077863 A1  Mar. 22, 2018

Related U.S. Application Data

(60) Provisional application No. 62/397,689, filed on Sep. 21, 2016.

(51) Int. Cl.
*A01D 34/71* (2006.01)
*A01D 34/66* (2006.01)
*A01D 101/00* (2006.01)

(52) U.S. Cl.
CPC .............. *A01D 34/71* (2013.01); *A01D 34/66* (2013.01); *A01D 2101/00* (2013.01)

(58) Field of Classification Search
CPC ...... A01D 34/71; A01D 43/063; A01D 34/66; A01D 2101/00; A01D 43/06; A01D 43/07; A01D 43/077; A01D 34/63; A47L 5/14; A47L 5/18; A47L 9/14; A01G 20/43; A01G 20/47; E01H 1/0809; Y10S 56/20; Y10T 137/85978
See application file for complete search history.

(56) References Cited

U.S. PATENT DOCUMENTS

| D213,328 | S | * | 2/1969 | Smith et al. ................... D15/17 |
| 3,499,275 | A | | 3/1970 | Lozen |
| 3,568,421 | A | * | 3/1971 | Smith et al. ........... A01D 34/63 56/202 |
| 3,934,392 | A | * | 1/1976 | Moery ................. A01D 43/063 56/202 |

(Continued)

FOREIGN PATENT DOCUMENTS

JP    2003235320 A    8/2003

OTHER PUBLICATIONS

International Search Report and Written Opinion for International Patent Application No. PCT/US2017/052669 dated Dec. 12, 2017.

*Primary Examiner* — Arpad Fabian-Kovacs
(74) *Attorney, Agent, or Firm* — Wegman Hessler

(57) ABSTRACT

A double deck boot attachment for a lawn maintenance tool includes a smaller deck boot and a larger deck boot including an interior volume. The smaller deck boot is an attachment for at least one first lawn maintenance tool and the larger deck boot is an attachment for at least one second lawn maintenance tool. At least a portion of the smaller deck boot is configured to slide within the interior volume of the larger deck boot from a separated position to an assembled position and the double deck boot is configured to be stored and shipped as one deck boot with one stock keeping unit code.

16 Claims, 5 Drawing Sheets

(56) References Cited

U.S. PATENT DOCUMENTS

| | | | | |
|---|---|---|---|---|
| 4,158,279 | A * | 6/1979 | Jackson | A01D 43/07 56/16.6 |
| 4,532,755 | A * | 8/1985 | Schemelin | A01D 43/063 56/16.6 |
| 4,718,222 | A * | 1/1988 | Lambert | A01D 43/063 56/16.6 |
| 4,922,696 | A * | 5/1990 | Burns | A01D 43/07 298/10 |
| 4,936,083 | A | 6/1990 | Deutsch | |
| 5,864,919 | A * | 2/1999 | Pineda | A47L 5/14 15/339 |
| 5,913,804 | A * | 6/1999 | Benway | A01D 34/71 56/202 |
| 5,992,135 | A * | 11/1999 | Benway | A01D 34/71 56/200 |
| 6,151,875 | A * | 11/2000 | Collins | A01D 43/06 56/199 |
| 9,226,445 | B2 * | 1/2016 | DeHart | A01D 43/06 |
| 2004/0221563 | A1 * | 11/2004 | Funk | A01D 43/063 56/202 |
| 2006/0168932 | A1 * | 8/2006 | Toporski | A01D 43/063 56/202 |
| 2015/0237800 | A1 | 8/2015 | Dehart | |
| 2015/0237808 | A1 * | 8/2015 | Prager | A47L 5/14 15/405 |
| 2019/0059224 | A1 * | 2/2019 | Swan | A01D 43/063 |

* cited by examiner

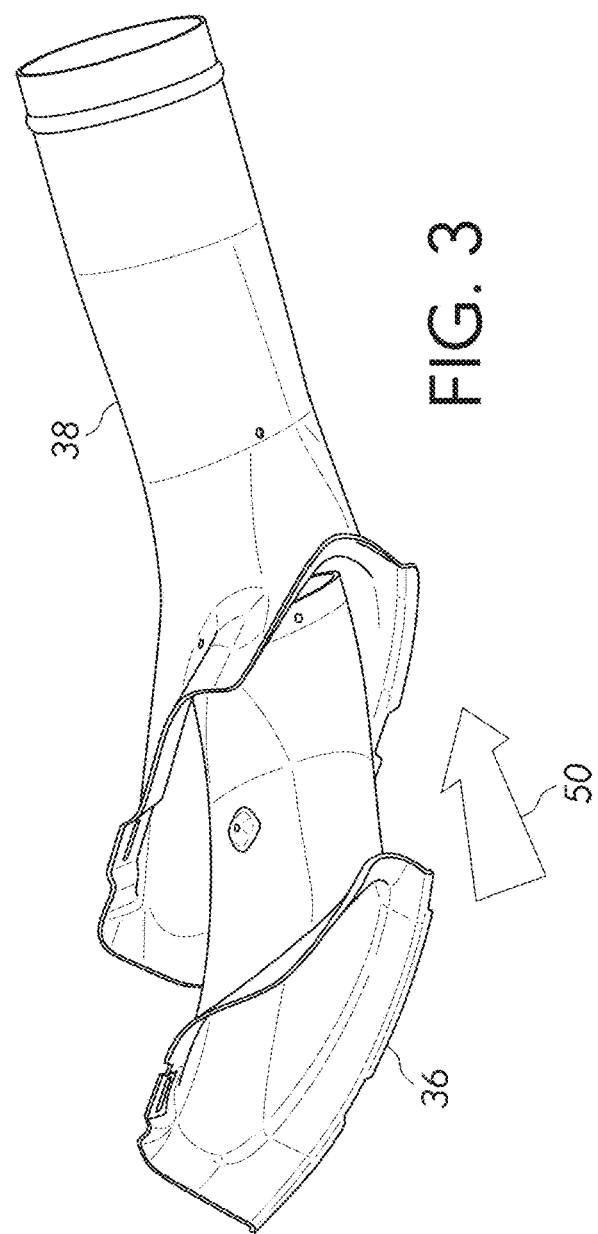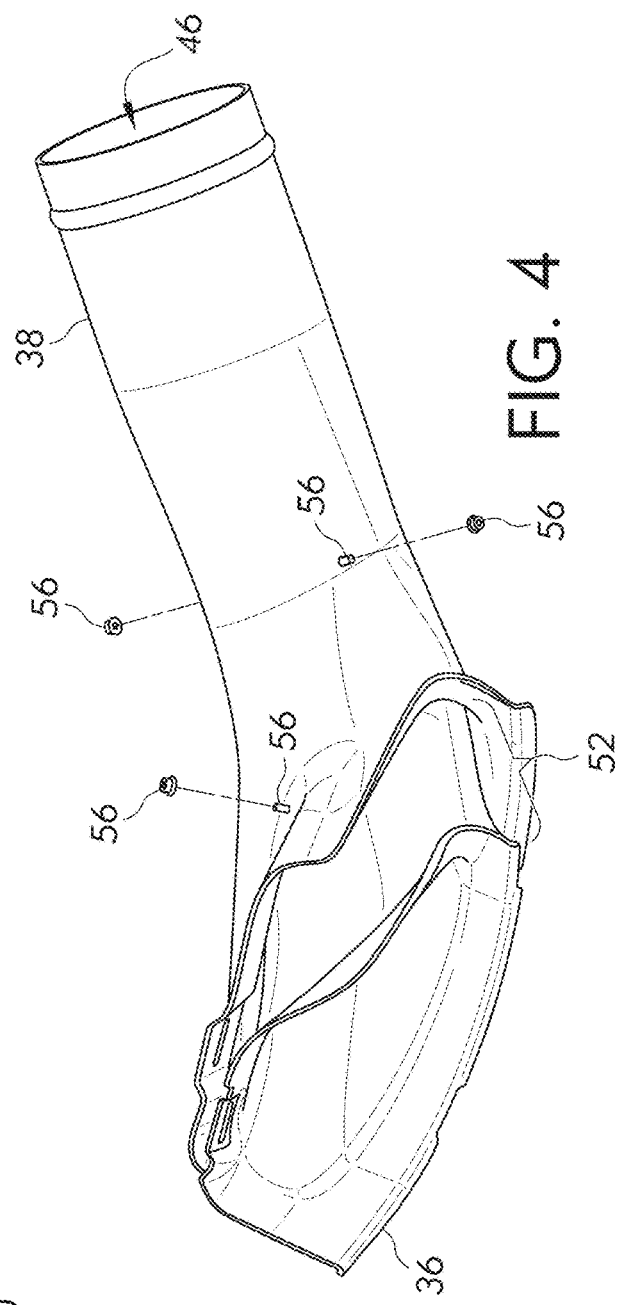

DOUBLE DECK BOOTS

This application claims the benefit of U.S. Provisional Application No. 62/397,689 filed Sep. 21, 2016, the entire disclosure of which is hereby incorporated herein by reference.

BACKGROUND

1. Field of the Disclosure

The present disclosure relates to lawn and garden equipment, and more particularly, to a double boot structure for chutes that provide a pathway for grass clippings leaving a mower deck.

2. Description of Related Art

Currently available walk-behind mowers, riding lawn mowers, garden tractors, and the like permit the use of mounted deck boots that provide a pathway for grass clippings to leave the underside of a cutting deck and travel to another location, such as a grass clippings bag. Typically, different mower models include different required sizes of deck boots. Stores and warehouses typically must store these various sizes. This can require additional time to sort, store, and locate the deck boots, in addition to including multiple stock keeping unit codes and occupying a significant amount of storage/display space.

Therefore, a need exists for a deck boot design that can lessen the amount of storage/display space and reduce or eliminate logistical issues such as stock keeping unit codes and proper selection of deck boot from a storage area.

BRIEF SUMMARY

According to one aspect of the present disclosure, a double deck boot attachment for a lawn maintenance tool includes a smaller deck boot and a larger deck boot including an interior volume. The smaller deck boot is configured to be an attachment for at least one first lawn maintenance tool and the larger deck boot is configured to be an attachment for at least one second lawn maintenance tool. At least a portion of the smaller deck boot is configured to slide within the interior volume of the larger deck boot from a separated position to an assembled position and the double deck boot is configured to be stored and shipped as one deck boot.

According to another aspect of the present disclosure, a method of handling lawn maintenance tool parts includes the step of providing a double deck boot attachment. The double deck boot attachment includes a smaller deck boot and a larger deck boot including an interior volume. The smaller deck boot is configured to be an attachment for at least one first lawn maintenance tool and the larger deck boot is configured to be an attachment for at least one second lawn maintenance tool. At least a portion of the smaller deck boot is configured to slide within the interior volume of the larger deck boot from a separated position to an assembled position. The method of handling lawn maintenance tool parts also includes the step of providing a single stock keeping unit code to the double deck boot attachment.

BRIEF DESCRIPTION OF THE DRAWINGS

The foregoing and other aspects of the present disclosure will become apparent to those skilled in the art to which the present disclosure relates upon reading the following description with reference to the accompanying drawings, in which:

FIG. 3 is similar to FIG. 2 showing the smaller deck boot placed partially within the larger deck boot;

FIG. 4 is similar to FIG. 2 showing the smaller deck boot placed in a position nearly entirely within the larger deck boot and fastened to the larger deck boot.

Figure 1:
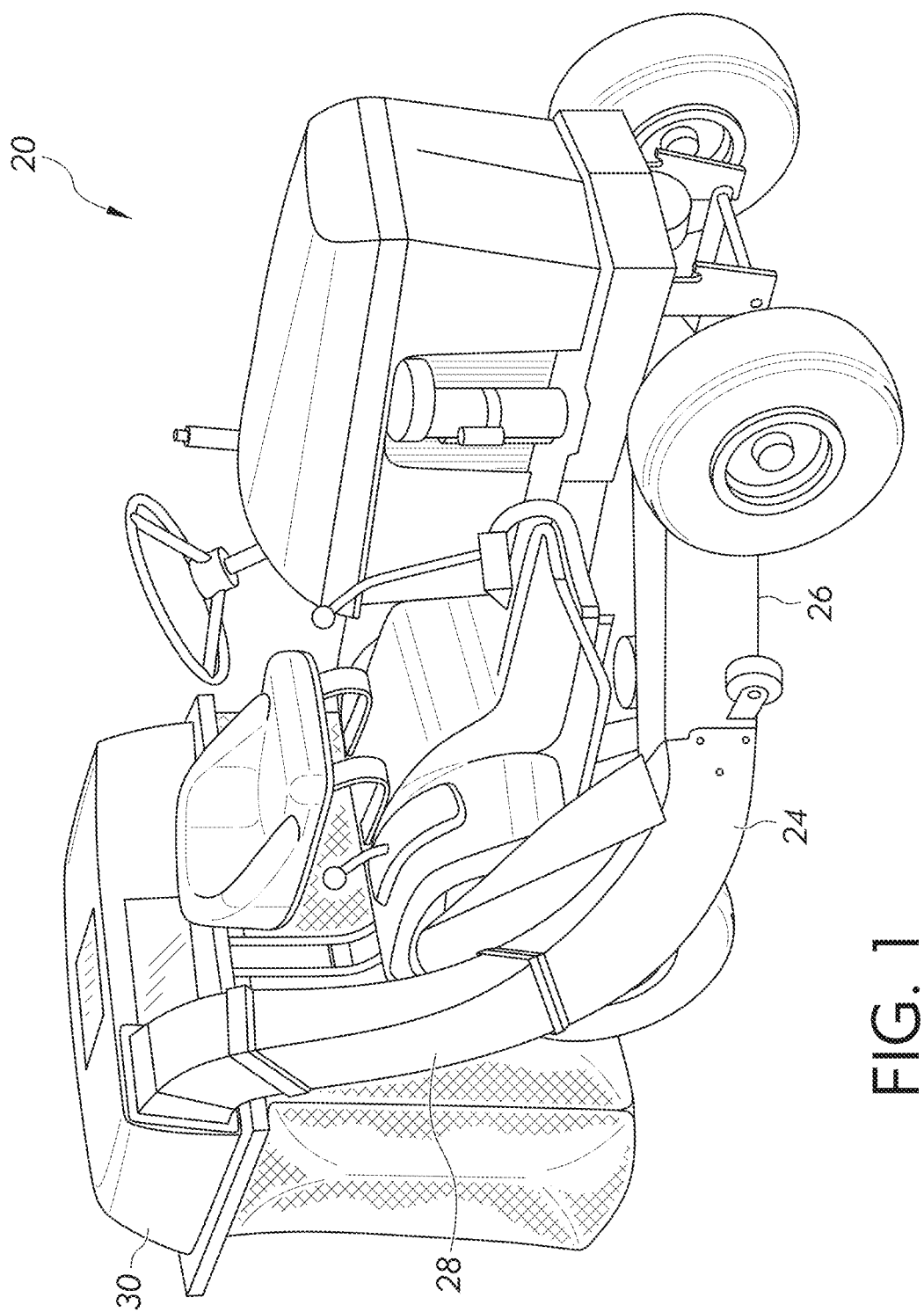
FIG. 1 is a perspective view of an example lawn maintenance tool having a deck boot to guide grass and/or vegetation clippings to a bagging arrangement.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Referring to the FIG. 1, an example lawn maintenance tool 20 is shown the form of a riding lawn mower. The lawn maintenance tool 20 employs a deck boot 24 that enables regulated passage of grass and/or vegetation clippings to pass from a mower deck 26 to an intermediate grass chute 28 and finally to a bagging arrangement 30. The deck boot 24 is often fastened to the mower deck 26 and the intermediate grass chute 28 to help ensure it remains in place during operation. From time to time, deck boots are sold in the aftermarket as needed by consumers. By their nature, deck boots can be relatively bulky but lightweight and have relatively large volumes of empty space surrounded by a shell exterior.

Figure 2:
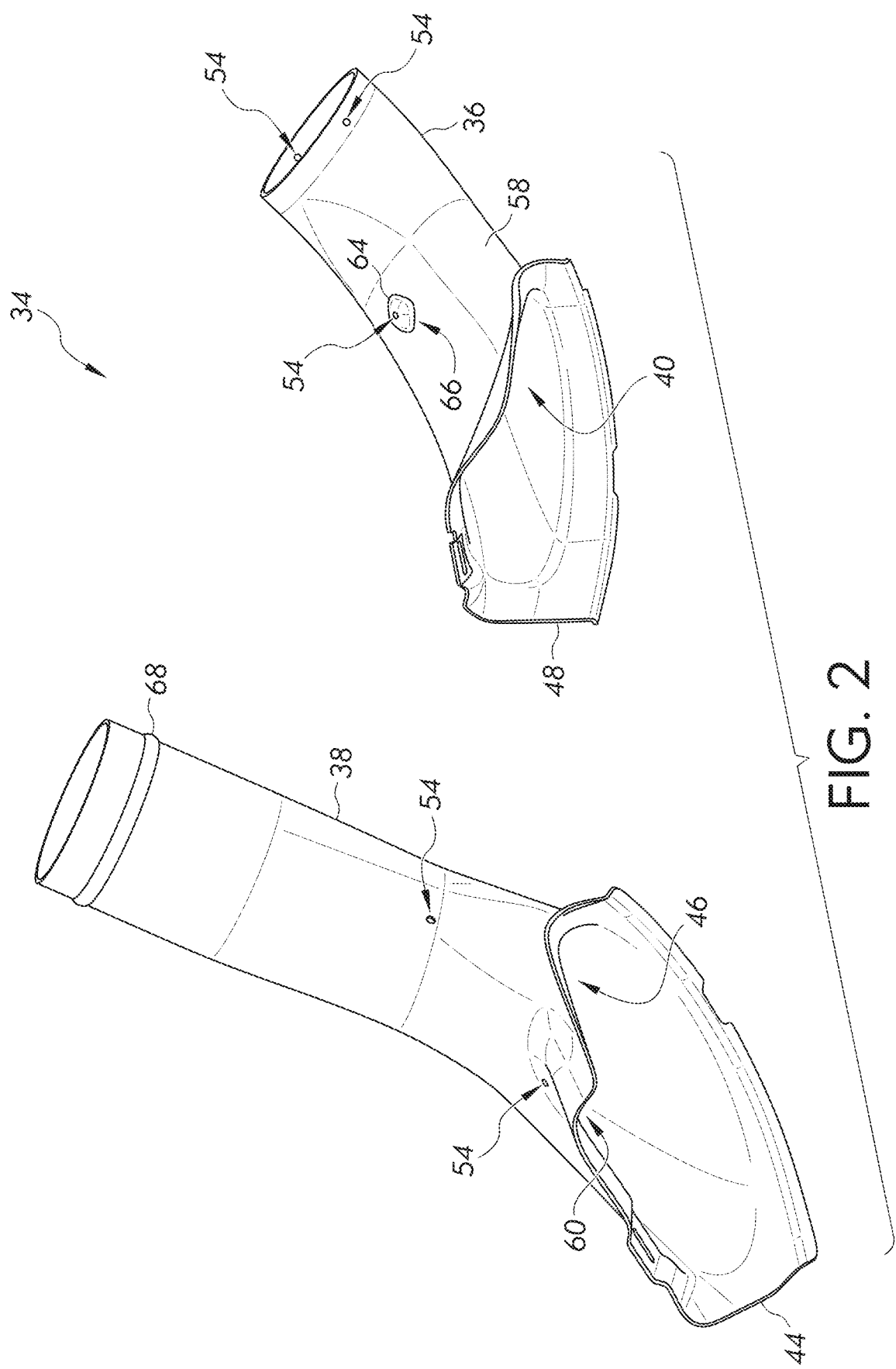
FIG. 2 is a perspective view of an example smaller deck boot and an example larger deck boot of a double deck boot arrangement according to at least one embodiment of the present disclosure.

Turning to FIG. 2, an exemplary embodiment of a double deck boot attachment 34 for lawn maintenance tools is shown in a separated position. The double deck boot attachment 34 includes at least two individual deck boots; a smaller deck boot 36 and a larger deck boot 38. The larger deck boot 38 includes an interior volume 46 within an exterior shell 44. Similarly, the smaller deck boot 36 also includes an interior volume 40 within an exterior shell 48.

Each of the smaller deck boot 36 and the larger deck boot 38 are configured to be an attachment for at least one lawn maintenance tool 20 (e.g., the riding mower best seen in FIG. 1). FIG. 1 is merely an example of the use of a generic deck boot on a lawn maintenance tool 20. It is to be understood that the smaller deck boot 36 can be configured to be an attachment for at least one first lawn maintenance tool and the larger deck boot 38 can be configured to be an attachment for at least one second lawn maintenance tool. In one particular example, one manufacturer's riding mower models can require different deck boot sizes. For example, one riding mower can require one style deck boot configured to fit a 46-inch wide cutting deck. Another riding mower from the same manufacturer can require a smaller deck boot, such as one configured to fit a 42-inch wide cutting deck. These two sizes are only meant to be exemplary, and any suitable size combinations can be used.

As previously noted, both the smaller deck boot 36 and the larger deck boot 38 can include relatively large interior volumes 40, 46 of empty space surrounded by an exterior shell 48, 44. Storage, distribution, and display of the individual deck boots 36, 38 can take relatively large amounts of space, thus increasing the cost of each phase of selling the deck boots in the aftermarket parts manufacturing and distribution streams. Turning to FIG. 3, a portion of one smaller deck boot 36 is configured to slide within the interior volume of the larger deck boot 38 in the direction of arrow 50.

Turning to FIG. 4, the smaller deck boot 36 is positioned at a particular location such that a portion of the smaller deck boot 36 is within the interior volume 46 of the larger deck boot 38. This is considered the assembled position of the double deck boot attachment 34. When in the assembled position, a portion 52 of the smaller deck boot 36 remains outside of the interior volume 46 of the larger deck boot 38. As desired, the smaller deck boot 36 can be repeatedly slid into the larger deck boot 38 and slid out of the larger deck boot 38 as desired from a separated position to an assembled position. When in the assembled position, the double deck boot attachment 34 is configured to be stored and shipped as a single item. As such, a single stock keeping unit code (SKU code) can be applied to the double deck boot attachment to store, track, ship, and sell the double deck boot attachment 34 through the manufacturing, storage, distribution, and sales portions of the product lifecycle.

Figure 5:
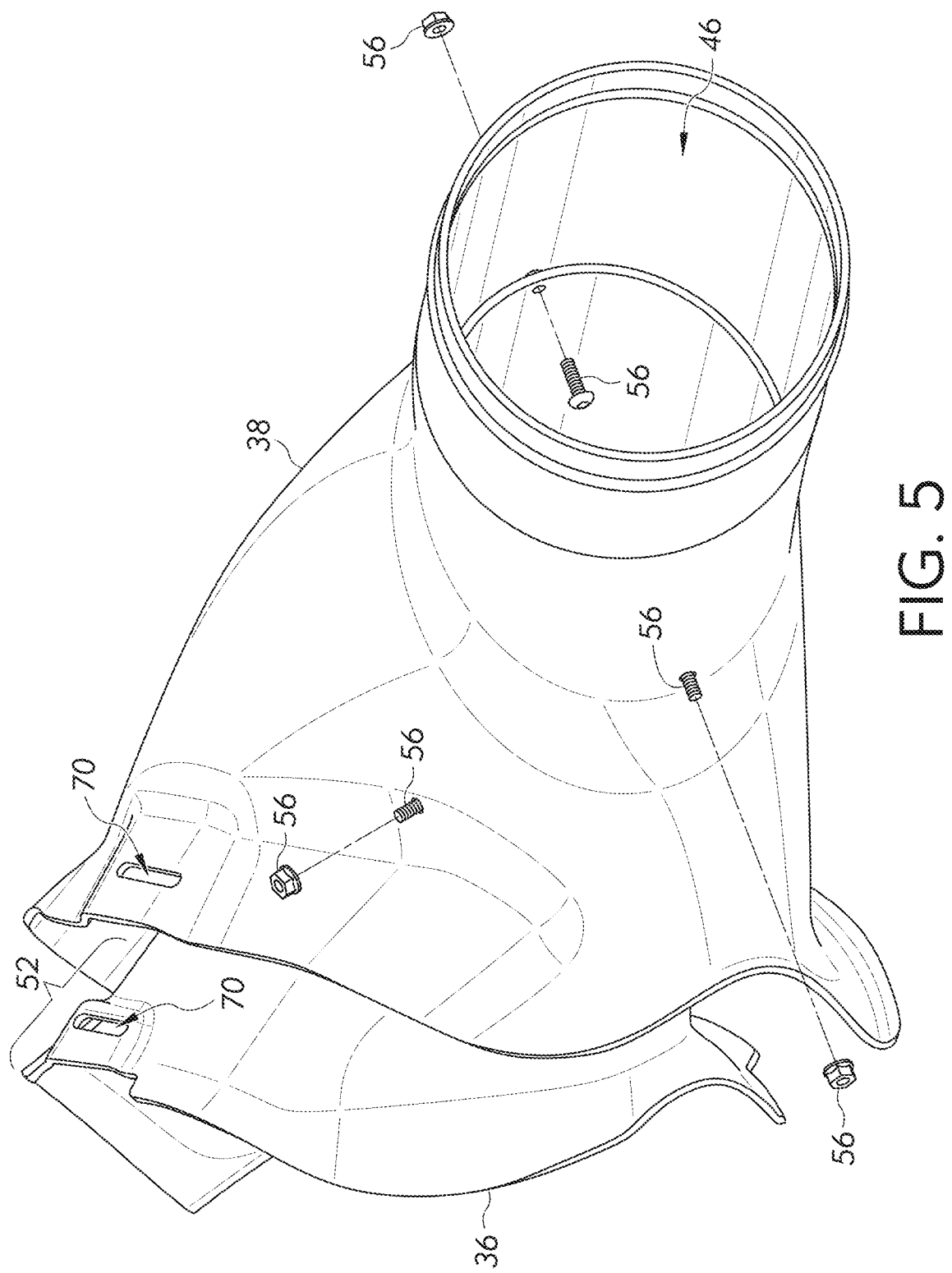
FIG. 5 is a perspective end view showing mounting locations for the smaller deck boot and the larger deck boot of FIG. 2.

Returning to FIG. 2, in one example, the smaller deck boot 36 can define at least one aperture 54 configured to cooperate with a fastener 56 (best seen in FIGS. 4 and 5). Similarly, the larger deck boot 38 can define at least one aperture 54 configured to cooperate with the fastener 56. In the shown example, the fastener 56 is configured to secure the smaller deck boot 36 to the larger deck boot 38. In one particular example, the fastener 56 can include a multi-part threaded fastener, such as a nut and bolt fastener. As such, the apertures 54 defined by the smaller deck boot 36 are arranged to align with the apertures 54 of the larger deck boot 38 when the double deck boot attachment 34 is in the assembled position.

When nut and bolt fasteners are used to secure the smaller deck boot 36 within the larger deck boot 38, an operator can reach into the interior volume 40 of the smaller deck boot 36 with one hand and place the bolt into the aligned apertures 54 and then thread the nut onto the shank of the bolt from outside the larger deck boot 38. In the shown example, each deck boot 36, 38 can define three apertures 54 (best seen in FIG. 2) suitable for three fasteners 56 (best seen in FIG. 5) configured to secure the smaller deck boot 36 to the larger deck boot 38. When the smaller deck boot 36 and the larger deck boot 38 are secured together as a double deck boot attachment 34, they can more reliably remain in the assembled position throughout the storage, distribution, display, and sales functions of their lifecycle.

In some examples, an exterior surface 58 of the smaller deck boot 36 may not normally be in close proximity to an interior surface 60 of the larger deck boot 38 when in the assembled position. In such cases, the smaller deck boot 36 can include a boss 64 that has a mating surface 66. The mating surface 66 is configured to cooperate with the inner surface 60 of the larger deck boot 38 to facilitate attachment of the smaller deck boot 36 to the larger deck boot 38. In other words, moving the mating surface 66 closer to the inner surface 60 of the larger deck boot 38 can reduce deformation of the smaller deck boot 36 and provide more reliable attachment schemes.

Of course, the fastener 56 can also include other fasteners, and is not limited to threaded fasteners. Indeed, the use of clips, pins, cotter pins, adhesives, or other attachment schemes are contemplated. Some of these attachment schemes may not require the use of the apertures 54.

Returning to FIG. 2, at least one of the deck boots 36, 38 defines a structure 68 configured to mount the at least one of the deck boots 36, 38 to the intermediate grass chute 28. The structure 68 is shown as a raised, annular section, however, any suitable structure can be used to mount the deck boot 36, 38 to the intermediate grass chute 28 such as clips, threaded fasteners, compression fit, etc.

Turning to FIG. 5, the smaller deck boot 36 defines a structure 70 configured to enable attachment of the smaller deck boot 36 to the associated mower deck 26 (best seen in FIG. 1). As shown in FIG. 5, the structure 70 can be a slot, configured to cooperate with any number of structures located on the associated mower deck 26 to help secure the smaller deck boot 36. Similarly, the larger deck boot 38 includes similar structure 70, also enabling attachment of the larger deck boot 38 to the associated mower deck 26. Other forms of the structure 70 are contemplated such as clips, pins, holes for hooked bungee cords, etc.

Figure 6:
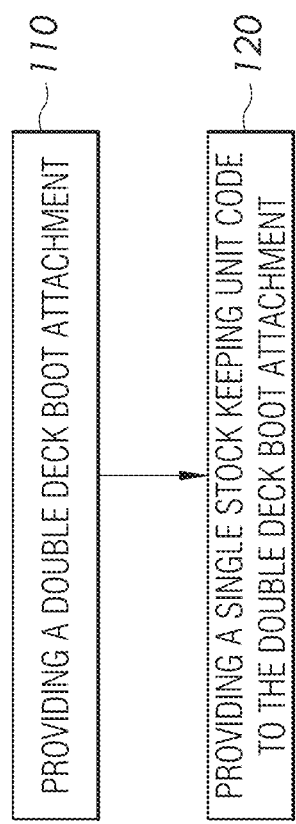

Turning to FIG. 6, a method of handling lawn maintenance tool parts, will now be described. The method of handling lawn maintenance tool parts, which can include aftermarket parts includes the step 110 of providing a double deck boot attachment as has been previously described. The double deck boot attachment includes a smaller deck boot and a larger deck boot including an interior volume. The smaller deck boot is configured to be an attachment for at least one first lawn maintenance tool and the larger deck boot is configured to be an attachment for at least one second lawn maintenance tool such as a riding lawn mower. At least a portion of the smaller deck boot is configured to slide within the interior volume of the larger deck boot from a separated position to an assembled position. The method further includes the step 120 of providing a single stock keeping unit code (SKU code) to the double deck boot attachment.

In one example, the method can further include the step of storing the double deck boot attachment in the assembled position. Storage of the two deck boots in the space that is relatively close to the space required by each individual deck boot when in the separated position can save a significant amount of storage space. In another example, the method can further include the step of shipping the double deck boot attachment in the assembled position. Similar to the storage space requirement reduction, the amount of shipping space required is nearly halved, enabling savings in space, time, and transportation costs.

Another example of the method includes the step of selling the double deck boot attachment in the assembled position using the single SKU code. This can provide benefit for both the dealer (or retailer) and the consumer. Neither will have to take the time to find out which of the two sizes of deck boot are required, as they are sold as a pair.

As a summary, after manufacturing, the deck boots can be paired in twos, one being the larger deck boot, the other being the smaller deck boot. The smaller deck boot is placed within the larger deck boot such that no portion or a relatively small portion of the smaller deck boot extends outside of the volume boundaries of the larger deck boot.

Then, the combined "double deck boot" can be stored, shipped, and sold as one piece, with only one SKU code. The end customer can then mount one of the deck boots to the riding mower and then discard or recycle the other of the deck boots that is not required for their particular mower model. In another example, the retailer or dealer can sell both of the deck boots individually.

The disclosed double deck boot can provide several benefits. The double deck boot can provide a convenient, quick, and inexpensive way to select the proper deck boot from a warehouse or store shelf. Additionally, the double deck boot can eliminate at least one SKU code for each pair of different deck boots, saving time and money in the distribution logistics of lawn maintenance tools. Furthermore, the double deck boot can save space in both the warehouse function and a storage/display function in a retail location.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A double deck boot attachment for a lawn maintenance tool,
the double deck boot attachment comprising:
a smaller deck boot; and
a larger deck boot including an interior volume,
wherein the smaller deck boot is configured to be an attachment for at least one first lawn maintenance tool and the larger deck boot is configured to be an attachment for at least one second lawn maintenance tool,
wherein the smaller deck boot is configured to slide within the interior volume of the larger deck boot from a separated position to an assembled position, such that in the assembled position, a small portion of the smaller deck boot extends outside of the interior volume of the larger deck boot, and the double deck boot is configured to be stored and shipped as a single deck boot.

2. The double deck boot attachment according to claim 1, further including at least one fastener configured to secure the smaller deck boot to the larger deck boot.

3. The double deck boot attachment according to claim 1, further including three fasteners configured to secure the smaller deck boot to the larger deck boot.

4. The double deck boot attachment according to claim 1, wherein the smaller deck boot further defines at least one aperture configured to cooperate with a fastener.

5. The double deck boot attachment according to claim 4, wherein the smaller deck boot further comprises a boss that has a mating surface, the mating surface is configured to cooperate with an inner surface of the larger deck boot to facilitate attachment of the smaller deck boot to the larger deck boot.

6. The double deck boot attachment according to claim 1, wherein the larger deck boot further defines at least one aperture configured to cooperate with a fastener.

7. The double deck boot attachment according to claim 1, wherein at least one of the deck boots defines a structure configured to mount the at least one of the deck boots to an intermediate grass chute.

8. The double deck boot attachment according to claim 1, wherein the smaller deck boot defines a structure configured to enable attachment of the smaller deck boot to an associated mower deck.

9. The double deck boot attachment according to claim 8, wherein the structure configured to enable attachment of the smaller deck boot to the associated mower deck is a slot.

10. The double deck boot attachment according to claim 1, wherein the larger deck boot defines a structure configured to enable attachment of the larger deck boot to an associated mower deck.

11. The double deck boot attachment according to claim 10, wherein the structure configured to enable attachment of the larger deck boot to the associated mower deck is a slot.

12. The double deck boot attachment according to claim 1, wherein the smaller deck boot comprises an exterior surface, wherein the exterior surface is adjacent to the interior volume of the larger deck boot when in the assembled position.

13. A method of handling lawn maintenance tool parts, the method comprising the steps of:
providing a double deck boot attachment, the double deck boot attachment comprising:
a smaller deck boot having at least one aperture; and
a larger deck boot including an interior volume, the larger deck boot having at least one aperture;
wherein the smaller deck boot is configured to be an attachment for at least one first lawn maintenance tool and the larger deck boot is configured to be an attachment for at least one second lawn maintenance tool,
wherein at least a portion of the smaller deck boot is configured to slide within the interior volume of the larger deck boot from a separated position to an assembled position, wherein in the assembled position, the aperture of the smaller deck boot is arranged to align with the aperture of the larger deck boot; and
providing a single stock keeping unit code to the double deck boot attachment.

14. The method according to claim 13, further comprising the step of storing the double deck boot attachment in the assembled position.

15. The method according to claim 13, further comprising the step of shipping the double deck boot attachment in the assembled position.

16. The method according to claim 13, further comprising the step of selling the double deck boot attachment in the assembled position using the single stock keeping unit code.

* * * * *